United States Patent [19]

Mittelhäuser et al.

[11] Patent Number: 4,768,871
[45] Date of Patent: Sep. 6, 1988

[54] MIRROR FOR MOTOR VEHICLES

[75] Inventors: Bernhard Mittelhäuser, No. 57, D-3002 Wedemark 2, Fed. Rep. of Germany; Norbert Kürschner, Wedemark, Fed. Rep. of Germany

[73] Assignee: Bernhard Mittelhäuser, Wedemark, Fed. Rep. of Germany

[21] Appl. No.: 112,043

[22] Filed: Oct. 21, 1987

Related U.S. Application Data

[63] Continuation of Ser. No. 879,289, Jun. 27, 1986, abandoned.

[30] Foreign Application Priority Data

Jun. 29, 1985 [DE] Fed. Rep. of Germany ....... 3523370

[51] Int. Cl.$^4$ .............................. G02B 7/18; B60R 1/06
[52] U.S. Cl. ................................... 350/634; 350/632; 74/471 XY; 74/502.1; 92/92; 60/533; 60/571
[58] Field of Search ............... 350/632, 636, 637, 625, 350/626, 627, 634, 636; 74/501 M, 471 XY; 248/481, 483, 479, 476; 60/536, 567, 571, 533, 581; 92/89, 90, 91, 92

[56] References Cited

U.S. PATENT DOCUMENTS

| | | | |
|---|---|---|---|
| 1,913,874 | 6/1933 | Folberth et al. | 74/502.1 |
| 2,928,318 | 3/1960 | Friday | 74/502.1 |
| 3,013,392 | 12/1961 | Falge et al. | 74/502.1 |
| 3,077,142 | 2/1963 | Jacobson | 74/502.1 |
| 3,137,214 | 6/1964 | Feld et al. | 92/90 |
| 3,283,607 | 11/1966 | Van Moord | 74/502.1 |
| 3,370,480 | 2/1968 | Gionet et al. | 74/502.1 |
| 3,873,190 | 3/1975 | Hess | 74/502.1 X |
| 4,150,585 | 4/1979 | Manzoni | 74/471 XY X |

FOREIGN PATENT DOCUMENTS

| | | | |
|---|---|---|---|
| 800022 | 4/1936 | France | 60/581 |
| 2363017 | 3/1978 | France | 74/502.1 |
| 2424834 | 1/1980 | France | 350/632 |
| 54-42738 | 4/1979 | Japan | 350/637 |
| 54-42739 | 4/1979 | Japan | 350/637 |
| 2178384 | 2/1987 | United Kingdom | 350/632 |
| 2179013 | 2/1987 | United Kingdom | 350/632 |

Primary Examiner—Gary L. Smith
Assistant Examiner—Rodney M. Lindsey
Attorney, Agent, or Firm—Becker & Becker, Inc.

[57] ABSTRACT

An adjustable rear view mirror, the mirror element of which is supported by a ball-and-socket-like joint, and can be adjusted by two elements that can be actuated by pressure medium. In order to use single-acting adjustment elements, a reset spring is associated with the two elements. This reset spring is disposed on an imaginary line that bisects the angle defined by the two adjustment elements and the ball-and-socket-like joint. This reset spring is expediently a compression spring that is disposed across from the two adjustment elements.

3 Claims, 1 Drawing Sheet

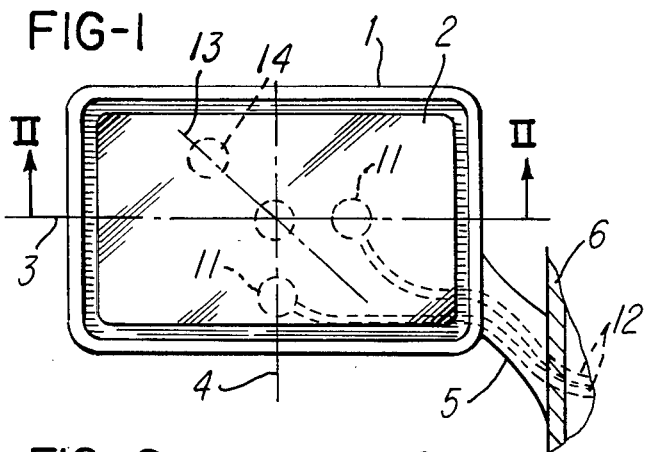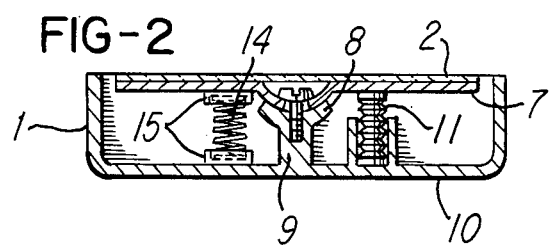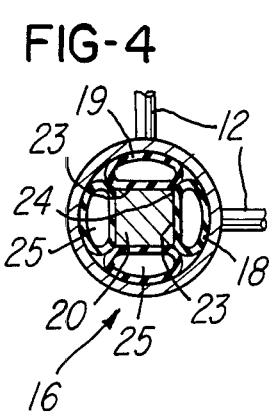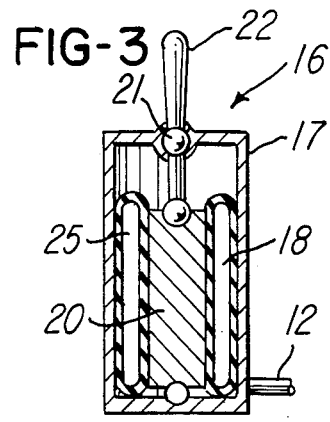

MIRROR FOR MOTOR VEHICLES

This application is a continuation of application Ser. No. 879,289, filed June 27, 1986, now abandoned.

BACKGROUND OF THE INVENTION

1. Field of the Invention

The present invention relates to an adjustable rear view or side view mirror for a motor vehicle, especially a mirror for the outside of the vehicle, with the mirror body or element being supported by a ball-and-socket-like joint, and being adapted to be adjusted by two elements, such as small working cylinders or bellows, that can be actuated by a pressure medium.

2. Description of the Prior Art

With the heretofore known mirrors of this general type, the elements that serve to effect adjustment are embodied in such a way that they are double-acting in that they can selectively transmit forces in either direction along their longitudinal axis. This requires a special, relatively expensive construction.

An object of the present invention is to improve mirrors of the aforementioned general type in such a way that, in a simple manner, single-acting adjustment elements can be used, thereby greatly reducing the expense for the adjustment mechanism of such a mirror.

BRIEF DESCRIPTION OF THE DRAWING

This object, and other objects and advantages of the present invention, will appear more clearly from the following specification in conjunction with the accompanying schematic drawing, in which:

FIG. 1 is a view that shows one inventive embodiment of an external rear view mirror for a motor vehicle;

FIG. 2 is a cross-sectional view taken along the line II—II in FIG. 1;

FIG. 3 is a vertical cross-sectional view through one embodiment of a control element for the mirror of FIG. 1; and FIG. 4 is a cross-sectional view through the control element of FIG. 3.

SUMMARY OF THE INVENTION

The mirror of the present invention is characterized primarily in that the two adjustment elements are embodied in such a way that they are effective in one direction only; in addition, associated with the two elements is a single reset spring that is disposed on an imaginary line that bisects the angle defined by the ball-and-socket-like joint on the one hand and the two elements on the other hand.

A significant advantage of the present invention is that straightforward expansion or bellows elements can be utilized, with these elements carrying out a movement in one direction only. A reset spring, preferably in the form of a compression spring, is associated with these elements. This reset spring effects the return of the mirror element for both of the elements. Since this reset spring is disposed on the aforementioned angle bisector, it acts for both of the elements. Thus, the expense for costly components is considerably reduced.

Pursuant to the present invention, the control element for the two elements can also be simplified by utilizing a control rod that can be pivoted in all directions and is disposed on a displacement element for two elastic pressure medium containers or reservoirs. Each of the reservoirs is in operative communication with one of the elements for adjusting the mirror in such a way that these reservoirs can actuate the adjustment elements. In addition, the displacement element is provided with operating surfaces that are disposed at right angles to one another. One of these operating surfaces acts upon one of the pressure medium reservoirs, while the operating surface acts upon the other reservoir. Thus, during perpendicular movement of the displacement element, only one adjustment element is displaced, wheras movements of the displacement element at an angle lead to simultaneous actuation of both pressure medium reservoirs, i.e. to adjustment of the mirror element about both a horizontal and a vertical axis.

Further specific features of the present invention will be described in detail subsequently.

DESCRIPTION OF PREFERRED EMBODIMENTS

Referring now to the drawing in detail, the mirror body or element 2 is disposed in the opening of a somewhat cup-shaped housing 1. The mirror element 2 can be adjusted about the horizontal axis 3 and the vertical axis 4.

The housing 1 is connected via a hollow support member 5 to the outer surface 6 of the vehicle.

The mirror element 2 is secured to a plate 7, the center of which is supported from behind by a ball-and-socket-like joint 8. The plate 7 can consequently be pivoted together with the mirror element 2. The support 9 for the ball-and-socket-like joint 8 is connected to the base 10 of the housing 1.

Two elements 11, which are embodied as bellows (accordion configuration), serve for the adjustment of the mirror element 2. The adjustment elements 11 are acted upon by a pressure medium (for example oil under pressure) via the hoses or lines 12, whereby the elements can stretch or extend, which leads to a corresponding movement of the mirror element 2. One of the bellows, i.e. the element formed therefrom, lies in the horizontal axis 3, whereas the other element 11 lies in the vertical axis 4. The last-mentioned element 11 accordingly effects pivoting of the mirror element 2 about the horizontal axis 3, while the other element 11 leads to a pivoting of the mirror element 2 about the vertical axis 4.

The two axes 3 and 4 are disposed at right angles to one another, with the angle that these axes form being bisected by the line 13. Disposed along this bisector, on the opposite side (when viewed from the elements 11) of the ball-and-socket-like joint 8, which is disposed in the point of the angle, is a compression spring 14, which is held in an upper and lower cup 15. The compression spring 14 counterbalances the forces exerted by the elements 11. When one or both of the elements 11 are actuated, the compression spring 14 is appropriately biased. When the pressure in the elements 11 is reduced, the compression spring 14 returns the plate 7, along with the mirror element 2, to the normal position illustrated in the drawing. Since the central axis of the compression spring 14 is diposed in the angle bisector 13, the compression spring 14 can react to the forces of the two elements 11 in the manner described above, and in particular by single action and common effect of the two elements 11.

Disposed within the control element 16 of FIGS. 3 and 4, i.e. in the hollow cylindrical housing 17 thereof, are two elastically deformable pressure medium containers or reservoirs 18, 19 that are offset approximately 90° relative to one another. The pressure medium of these reservoirs 18, 19 is in operative communication with the elements 11 via the lines 12. Associated with these reservoirs 18, 19 is a displacement element 20 that has a rectangular cross-sectional shape. The top and bottom of the displacement element 20 are mounted in a ball-and-socket-like manner, with the upper ball-and-socket-like joint being connected to a control rod 22 that can be pivoted in all directions via a ball-and-socket-like joint 21.

Via the pivot movements of the control rod 22, it is thus selectively possible to act upon one or the other of the pressure medium reservoirs 18, 19 in order to thus actuate the associated element 11. Since the operating surfaces 23 of the displacement element 20 are disposed at right angles to one another, and the pressure medium reservoirs 18, 19 are offset by 90° relative to one another, individual ones of the reservoirs 18, 19 can be acted upon without affecting the adjacent pressure medium reservoir. However, it should be noted that by moving the displacement element 20 in the direction of the corner 24, both of the pressure medium reservoirs 18, 19 can be acted upon, which leads to pivoting of the mirror element 2 about both axes 3 and 4.

In order to be able to exert return or reset forces upon the displacement element 20, each of the two pressure medium reservoirs 18, 19 can, in addition, have disposed opposite thereto a respective deformable hollow body 25. However, these hollow bodies 25 are not absolutely necessary.

It should also be noted that the frictional and other holding forces on the movable parts of the mirror should be great enough that no undesired or accidental adjustment of the mirror element 2 occurs. Rather, an adjustment should only occur when finger pressure on the control rod 22 overcomes the frictional forces, or pressure transfer takes place within the two self-contained hydraulic systems. The break-away torque or moments must be greater than the forces stored, for example, in the spring 14.

The present invention is, of course, in no way restricted to the specific disclosure of the specification and drawing, but also encompasses any modifications within the scope of the appended claims.

What we claim is:

1. An adjustable mirror for a motor vehicle, comprising in combination:
    a substantially rectangular cup-shaped housing having a horizontal axis and a vertical axis that intersect each other;
    a ball-and-socket-like joint provided by said housing;
    a mirror element supported in said housing by said ball-and-socket-like joint located behind said mirror element where the horizontal axis and vertical axis intersect each other centrally of said housing;
    two adjustment elements that act on said mirror element for adjusting angular position thereof in said housing, with said adjustment elements being disposed along the horizontal axis and vertical axis offset from where the horizontal axis and vertical axis intersect each other as well as being in angularly displaced locations between said mirror element and said housing for effecting movement of said mirror element about axes intersecting each other at right angles and being in communication with pressure medium for actuation thereby; each of said adjustment elements being effective in one direction only;
    a reset spring that is mounted between said mirror element and said housing to one side of said ball-and-socket-like joint in a location remote from said two adjustment elements and that acts on said mirror element in a direction substantially opposite to the effective directions of said adjustment elements, with said reset spring being disposed in said housing on an imaginary line that bisects the angle defined by said ball-and-socket-like joint and said two adjustment elements;
    respective lines for carrying said pressure medium to said adjustment elements;
    two deformable pressure medium reservoirs that are offset relative to one another by 90°, with a respective line communicating with a given one of said reservoirs;
    a displacement element having a rectangular cross-sectional shape defined by surfaces disposed at essentially right angles to one another, with a given one of said surfaces acting upon a given one of said pressure medium reservoirs;
    a control rod that is operatively connected to said displacement element for moving the latter to effect said interaction between said pressure medium reservoirs and said surfaces of said displacement element.

2. A mirror according to claim 1, in which said reset spring is a compression spring, with said ball-and-socket-like joint being disposed between said compression spring on the one hand, and said two adjustment elements on the other hand.

3. A mirror according to claim 2, in which said housing, when installed on said vehicle, has an essentially horizontal adjustment axis as well as an essentially vertical adjustment axis for said mirror element, with one of said adjustment elements being disposed in said horizontal axis for adjusting the position of said mirror element about said vertical axis, while the other of said adjustment elements is disposed in said vertical axis for adjusting the position of said mirror element about said horizontal axis.

* * * * *